United States Patent
Shin et al.

(10) Patent No.: US 11,902,434 B2
(45) Date of Patent: Feb. 13, 2024

(54) CRUM CHIP AND SMART CARD

(71) Applicant: SAMSUNG ELECTRONICS CO., LTD., Suwon-si (KR)

(72) Inventors: Jong Seon Shin, Suwon-si (KR); Gi Jin Kang, Seoul (KR); Seung Su Jeon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 17/671,756

(22) Filed: Feb. 15, 2022

(65) Prior Publication Data

US 2022/0368517 A1 Nov. 17, 2022

(30) Foreign Application Priority Data

May 17, 2021 (KR) .......................... 10-2021-0063211

(51) Int. Cl.
| | |
|---|---|
| H04L 9/08 | (2006.01) |
| H04L 9/14 | (2006.01) |
| G06F 21/60 | (2013.01) |
| G06F 21/44 | (2013.01) |
| G06F 21/72 | (2013.01) |
| G06F 21/62 | (2013.01) |
| G06F 21/79 | (2013.01) |
| G03G 21/18 | (2006.01) |

(52) U.S. Cl.
CPC ................................. H04L 9/088 (2013.01)

(58) Field of Classification Search
CPC . H04L 9/008; H04L 9/14; G06F 21/62; G06F 21/44; G06F 21/79; G03G 21/1882; G03G 21/1892
See application file for complete search history.

(56) References Cited

U.S. PATENT DOCUMENTS

| | | | |
|---|---|---|---|
| 6,457,126 B1 | 9/2002 | Nakamura et al. | |
| 6,832,348 B2 | 12/2004 | Kawabe et al. | |
| 2012/0134687 A1* | 5/2012 | Jones | G03G 15/0863 399/12 |
| 2012/0317662 A1* | 12/2012 | Neo | G06F 21/73 726/34 |
| 2014/0164725 A1* | 6/2014 | Jang | G06F 21/575 710/316 |
| 2017/0208059 A1* | 7/2017 | Shin | H04W 12/069 |

(Continued)

FOREIGN PATENT DOCUMENTS

| | | |
|---|---|---|
| KR | 10-1118826 B1 | 4/2012 |
| KR | 10-1745821 B1 | 6/2017 |
| KR | 10-1988404 B1 | 7/2019 |

*Primary Examiner* — Vu V Tran
(74) *Attorney, Agent, or Firm* — Muir Patent Law, PLLC

(57) ABSTRACT

A customer replaceable unit monitor (CRUM) integrated circuit (IC) includes: a secure module configured to receive an encryption key and an encrypted test code from outside; and a CRUM module controlled by the secure module. The secure module may perform authorization on the basis of the received encryption key. The secure module may perform decryption of the encrypted test code to generate a decrypted test code. The secure module may store the decrypted test code in a volatile memory. The secure module may generate a test command based on the decrypted test code in the volatile memory, and provide the test command to the CRUM module.

20 Claims, 15 Drawing Sheets

(56) References Cited

U.S. PATENT DOCUMENTS

2017/0235939 A1* 8/2017 Caporale ............ H04L 63/0876
  726/2
2020/0117805 A1 4/2020 Li et al.
2021/0126946 A1* 4/2021 Chou ................... H04L 63/166

* cited by examiner

CRUM CHIP AND SMART CARD

CROSS-REFERENCE TO RELATED APPLICATION

This application claims priority from Korean Patent Application No. 10-2021-0063211 filed on May 17, 2021, in the Korean Intellectual Property Office, the disclosure of which is incorporated herein by reference in its entirety.

BACKGROUND

1. Field

Embodiments relates to a CRUM chip and a smart card. Specifically, embodiments relate to a CRUM chip and a smart card including a secure module.

2. Description of the Related Art

Image forming apparatuses such as printers, scanners, copiers, and multifunction devices use ink or toner to print images on paper. The ink or toner is used each time an image forming task is performed, and may be depleted when it is used for a predetermined period or longer. In this case, there is a need to newly replace a unit that stores ink or toner. In this way, components which are replaceable in the process of usage of the image forming apparatus may be referred to as replaceable units or consumables.

SUMMARY

Embodiments are directed to a customer replaceable unit monitor (CRUM) integrated circuit (IC), including: a secure module configured to receive an encryption key and an encrypted test code from outside; and a CRUM module controlled by the secure module. The secure module may perform authorization on the basis of the received encryption key. The secure module may perform decryption of the encrypted test code to generate a decrypted test code. The secure module may store the decrypted test code in a volatile memory. The secure module may generate a test command based on the decrypted test code in the volatile memory, and provide the test command to the CRUM module.

Embodiments are directed to a method of operating a CRUM integrated circuit (IC), including: operating in a test mode and operating in a user mode. Operating in the test mode may include performing decryption of an encrypted test code to generate a decrypted test code; storing the decrypted test code in a volatile memory; and turning off a security function of the CRUM IC while performing a test command on the basis of the decrypted test code. Operating in the user mode may include: performing authorization in response to an encryption key received from a host; and monitoring the CRUM IC using a user code stored in a read-only memory.

Embodiments are directed to a smart card, including: a secure module configured to receive an encryption key and an encrypted test code from outside; and an information processing module controlled by the secure module. The secure module may perform authorization on the basis of the received encryption key. The secure module may perform decryption of the encrypted test code to generate a decrypted test code. The secure module may store the decrypted test code in a volatile memory. The secure module may generate a test command based on the decrypted test code in the volatile memory, and provide the test command to the information processing module.

BRIEF DESCRIPTION OF THE DRAWINGS

Features will become apparent to those of skill in the art by describing in detail example embodiments with reference to the attached drawings in which.

DETAILED DESCRIPTION

Figure 1:
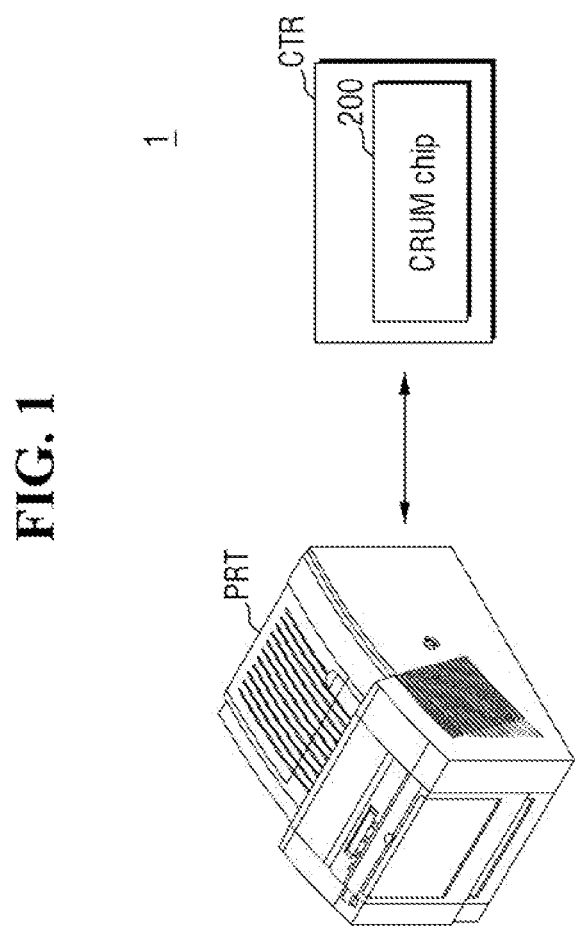
FIG. 1 is a diagram of an image forming apparatus according to an example embodiment.

FIG. 1 is a diagram of an image forming apparatus according to an example embodiment.

Referring to FIG. 1, an image forming apparatus 1 may be an apparatus, such as a printer, a scanner, a multifunction device, a facsimile, a copier, etc., that is capable of forming an image on paper or various recording media. The image forming apparatus 1 may include a main body PRT and a replaceable unit CTR that may be attached to/detached from the main body PRT.

The replaceable unit CTR may be mounted on the main body PRT of the image forming apparatus 1, and may be directly or indirectly connected to the image forming apparatus 1. For example, when the image forming apparatus 1 is a laser image forming apparatus or laser printer, the replaceable unit CTR may include a charging unit, an exposure unit, a developing unit, a transfer unit, a fixing unit, a roller, a belt, an organic photoconductor drum (OPC drum), and the like, e.g., as a user-replaceable toner cartridge. In other implementations, the replaceable unit CTR may include other units that are replaceable.

The replaceable unit CTR may include a customer replaceable unit monitor chip 200 (CRUM chip 200). The CRUM chip 200 may include information about the replaceable unit CTR, e.g., information that allows the image forming apparatus 1 to determine that the replaceable unit CTR is genuine. The CRUM chip 200 may be mounted on the replaceable unit CTR, and may record or store the information of the replaceable unit CTR. The CRUM chip 200 may include a memory, which may be referred to as a CRUM memory. The CRUM chip 200 may store characteristic information about the replaceable unit CTR, the CRUM chip 200 itself, and the image forming apparatus 1, and may store information or a program (e.g., code or processor instructions), e.g., for verification, an image forming operation, etc.

The program stored in the CRUM chip 200 may include an O/S (operating system) program, an encryption program, or the like, in addition to general applications. The characteristic information stored in the CRUM chip 200 may include information on the manufacturer of the replaceable unit CTR, information on the manufacturer of the image forming apparatus 1, an apparatus name of the image forming apparatus 1, information on the fabricated date of the CRUM chip 200, a serial number of the CRUM chip 200, a model name, digital signature information, an encryption key, an encryption key index, and the like. The usage information stored in the CRUM chip 200 may include information on a print amount, a printable amount, a remaining amount of toner, etc.

The CRUM chip 200 may include a CPU that may manage the memory, execute the program stored in the memory, and communicate with the main body PRT of the image forming apparatus 1 or a controller of another apparatus. Communication between the CRUM chip 200 and the main body PRT will be described in more detail in the following description.

Figure 2:
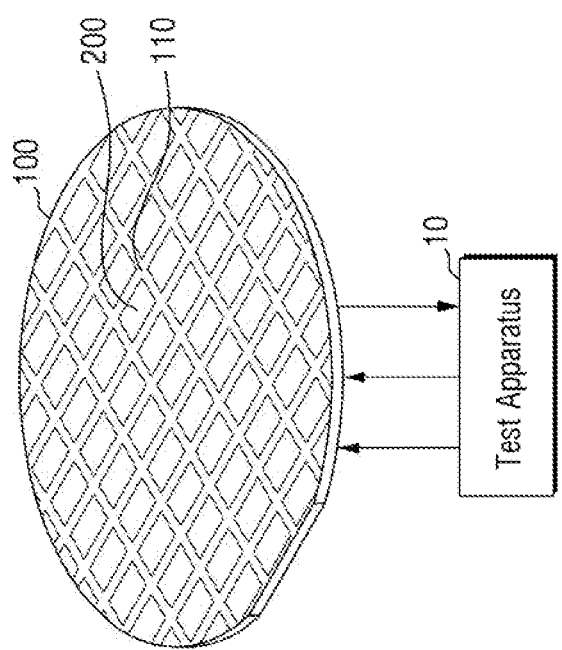
FIG. 2 is a diagram for explaining a test apparatus according to an example embodiment.
Figure 3:
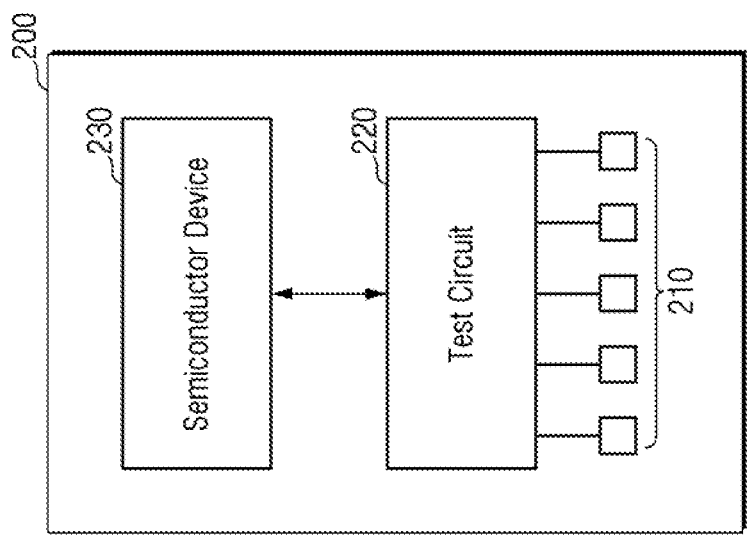
FIG. 3 is a block diagram of a CRUM chip according to an example embodiment.

FIG. 2 is a diagram for explaining a test apparatus according to an example embodiment. FIG. 3 is a block diagram of a CRUM chip according to an example embodiment.

Referring to FIG. 2, a plurality of integrated circuits (ICs) forming CRUM chips 200 or dies may be formed on a wafer 100 through a fabrication process, and the plurality of CRUM chips 200 may be fabricated into individual unit chips or packages through an assembly process, after being singulated along a scribe lane 110.

The wafer 100 may be subjected to an electric die sorting test (EDS test) by a test apparatus 10. For example, the test apparatus 10 may perform the EDS test on the wafer 100. For example, a wafer level test process or an EDS test process (for testing electrical characteristics of a semiconductor device 230 in the CRUM chip 200) may be performed between the fabrication process and the assembly process.

The wafer level test process may include, e.g., applying test signals to the CRUM chip 200 formed on the wafer 100, and analyzing the test result signal output from the CRUM chip 200 in response to the test signal, to thus determine whether the CRUM chip 200 is defective. For example, the test apparatus 10 may provide a test signal, and the test signal may be sent to the CRUM chip 200 through a probe card. Subsequently, the test apparatus 10 may receive a test result signal (a response to the test signal) from the CRUM chip 200 through the probe card to determine whether the CRUM chip 200 is defective.

Referring to FIG. 3, the CRUM chip 200 may include one or more test pads 210, a test circuit 220, and the semiconductor device 230. The semiconductor device 230 may be an IC that makes up the substance of the CRUM chip 200, and the test pads 210 and the test circuit 220 may be connected to the semiconductor device 230. The test pads 210 may be connected to the test circuit 220, and the test circuit 220 may be connected to the semiconductor device 230.

Each of the CRUM chips 200 may include the test pads 210 for use at the time of the wafer level test. When the probe card of the test apparatus 10 comes into contact with the test pads 210, the CRUM chip 200 may operate in a test mode in response to the test signal.

Electrostatic discharge (ESD) or noise may flow into the CRUM chip 200 through the test pads 210. To address the possibility of electrostatic discharge, an electrostatic protection circuit may be connected to the test pads 210.

The semiconductor device 230 may include a memory device, a processor, a power management integrated circuit (PMIC), and the like. The processor may include a microprocessor or a CPU that performs computing functions such as certain computations or tasks. The processor may be a multi-core processor made up of a plurality of processors. The processor may include a cache memory. The power management integrated circuit may control, e.g., minimize, power consumption of circuits in the CRUM chip 200.

The CRUM chip 200 may be coupled to the test apparatus 10 having the probe card through the test pads 210 to perform the wafer level test. In the wafer level test or the EDS test, the test circuit 220 may provide the semiconductor device 230 with a test clock signal, a test command signal, a test address signal, a test pattern signal, etc., through the test pads 210. For example, the test circuit 220 may provide the test signal to the semiconductor device 230.

Figure 4:
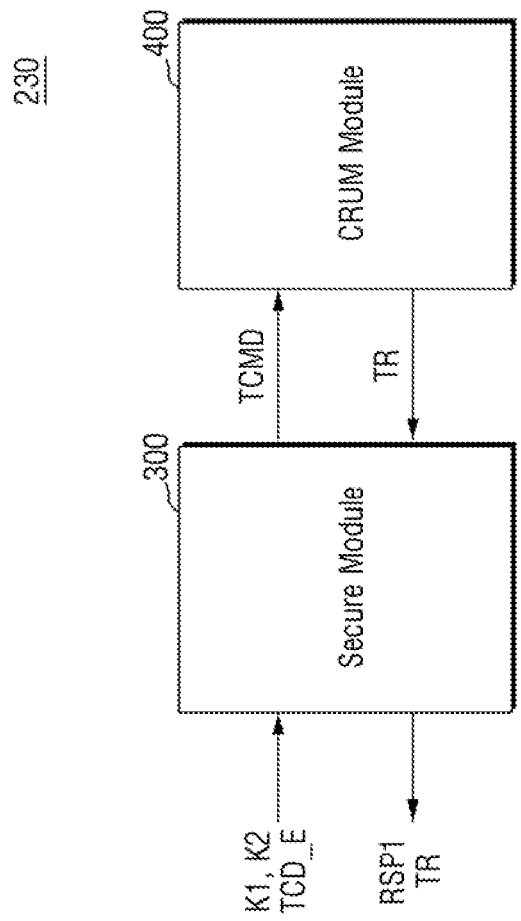
FIG. 4 is a block diagram of a semiconductor device according to an example embodiment.
Figure 5:
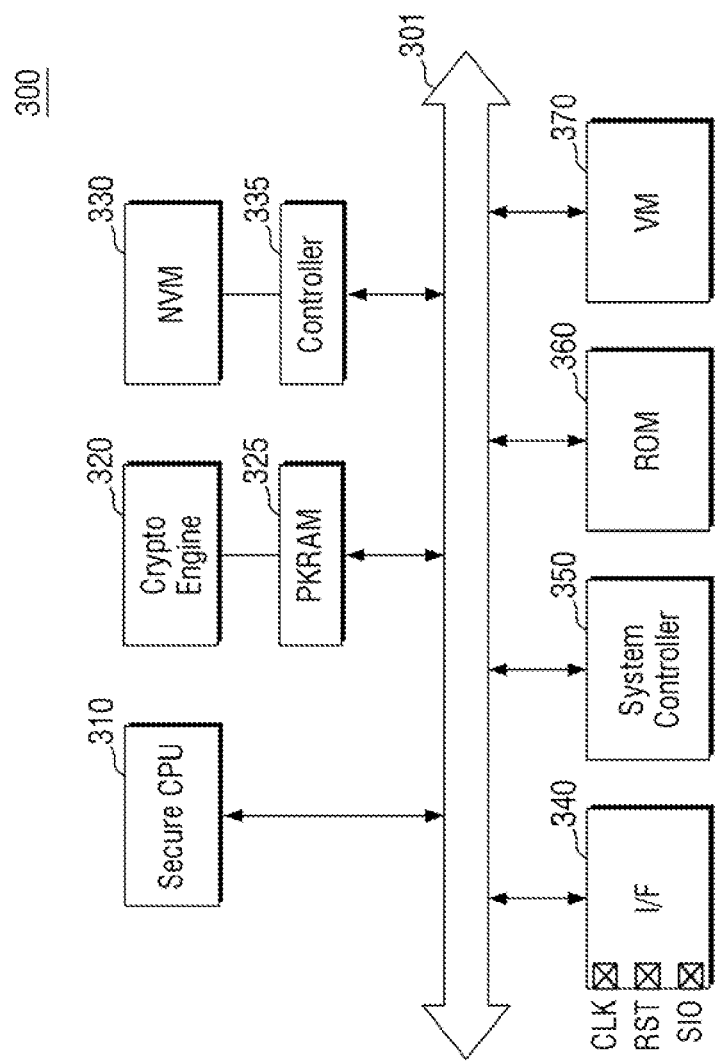
FIGS. 5 and 6 are block diagrams of the secure module of FIG. 4 according to an example embodiment.
Figure 6:
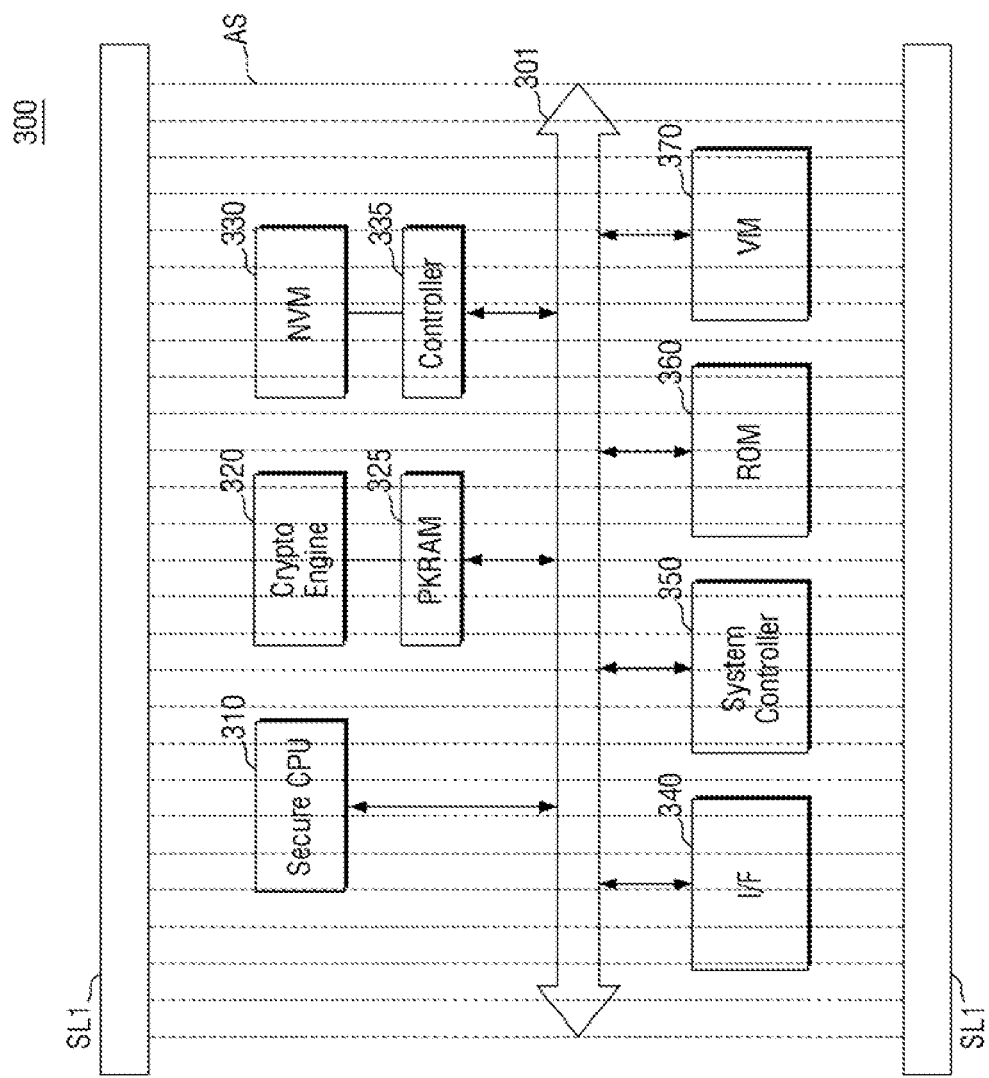

FIG. 4 is a block diagram of a semiconductor device according to an example embodiment. FIGS. 5 and 6 are block diagrams of the secure module of FIG. 4 according to an example embodiment.

Referring to FIG. 4, the semiconductor device 230 may be an example of the semiconductor device 230 of FIG. 3.

The semiconductor device 230 may include a secure module 300 and a CRUM module 400.

The secure module 300 may be configured to receive a first encryption key K1, a second encryption key K2, and an encrypted test code TCD_E, e.g., from the main body PRT of the image forming apparatus 1. For example, the secure module 300 may receive the first encryption key K1, the second encryption key K2, and the encrypted test code TCD_E through the test circuit 220.

The secure module 300 may output a first response signal RSP1 in response to the first encryption key K1, and may output a test result signal TR in response to the encrypted test code TCD_E. The first response signal RSP1 and the test result signal TR may be sent to the main body PRT through the test circuit 220.

The secure module 300 may generate a test command TCMD on the basis of the encrypted test code TCD_E, and may provide the test command TCMD to the CRUM module 400.

The CRUM module 400 may perform the wafer level test or the EDS test on the basis of the test command TCMD. The CRUM module 400 may output the result of performing the test, e.g., the CRUM module 400 may output the test result signal TR in response to the test command TCMD. The test result signal TR may be sent to the main body PRT through the secure module 300.

The CRUM module 400 may include information or the like about the CRUM chip 200, and may process information or the like about the main body PRT.

Referring to FIGS. 5 and 6, the secure module 300 may include a security CPU 310, a crypto engine 320, a PKRAM 325, a non-volatile memory (NVM) 330, a memory controller 335, an interface (I/F) 340, a system controller 350, a read-only memory (ROM) 360, and a volatile memory (VM) 370. Each component of the secure module 300 may communicate with each other through a bus 301, which may implement, e.g., an Advanced high performance bus (AHB) interface.

Referring to FIG. 6, the secure module 300 may include an active shield (AS) and side logics SL1 and SL2 that overlap each of the components 310 to 370 from the top.

The active shield AS may be an arrangement of signal lines extending in a first direction and arranged in parallel at a constant interval, and may be implemented by the use of a top metal on a plan view of the layout of the secure module 300. For example, the active shield AS may be a plurality of top metal lines that are parallel, while being spaced apart from each other at an interval of 1 μm.

The side logics SL1 and SL2 may be placed at both ends of the active shield AS, and may extend in a second direction that intersects the first direction. The side logics SL1 and SL2 may be electrically connected to the active shield AS. The side logics SL1 and SL2 may apply a predetermined signal to the active shield AS to prevent reverse engineering or probing from outside.

The security CPU 310 may generally control security-related operations of the secure module 300. For example, the security CPU 310 may match the information of the replaceable unit CTR with the main body PRT, and may provide the information of the CRUM module 400 to the main body PRT according to the matching result. The security CPU 310 may control the operation of the security-related crypto engine 320. When the security CPU 310 is turned on, the secure module 300 may perform the security-related operations, and when the security CPU 310 is turned off, the secure module 300 may not perform the security-related operations.

The crypto engine 320 may encrypt or decrypt data to be transmitted to the outside of the secure module 300 or data to be received from the outside. For example, the crypto engine 320 may receive an encrypted signal from the outside and decrypt it, and may provide a signal obtained by decrypting the signal of the secure module 300 to the outside. For example, the crypto engine 320 may perform private key encryption/decryption operations based on AES (Advanced Encryption Standard), DES (Data Encryption Standard) or SHA algorithm (Secure Hash Algorithm). The crypto engine 320 may perform error detection of encrypted data or decrypted data, e.g., a Big number multiplier (e.g., Tornado) used for computation, such as RSA/ECC. The encryption and decryption of a signal may be performed not only by the crypto engine 320.

The PKRAM 325 may be a memory connected to the crypto engine 320. The PKRAM 325 may include, e.g., a volatile memory or a non-volatile memory. The PKRAM 325 may store a public key, and the crypto engine 320 may perform encryption or decryption of data using the public key, a private key, or a password key.

The non-volatile memory 330 may be driven using the memory controller 335. The non-volatile memory 330 may store data to be booted up by the security CPU 310, initial data, and the like. The data which are read and output from the non-volatile memory 330 may include ECC bits corresponding to the stored data. The memory controller 335 may check the ECC bits of the read data to detect whether there is an error, and may correct the detected error.

The interface 340 may receive a signal from a host device (for example, the main body PRT of the image forming apparatus 1) or provide data according to the signal processing to the host device. The interface 340 may include a plurality of pins. For example, the interface 340 may include a clock signal pin CLK, a reset signal pin RST, a data pin SIO, and the like. The interface 340 may come into contact and communicate with the host device, e.g., using an ISO 7816 standard.

The system controller 350 may perform system control operations such as performing a clock control, a drive reset control, and a power supply control of the CRUM chip 200.

The read-only memory 360 may store data for driving the CRUM chip 200. For example, the read-only memory 360 may store user code for the operation of the CRUM module 400 in a user mode. The read-only memory 360 may store data that is set the fabricating process of the CRUM chip 200. Data stored in the read-only memory 360 may be only read, and may not be written or erased.

The volatile memory 370 may temporarily store data generated during the operation of the secure module 300 or the CRUM module 400. The data stored in the volatile memory 370 may be deleted, when the secure module 300 is reset. The volatile memory 370 may include, e.g., a dynamic random access memory (DRAM) or a static random access memory (SRAM).

Hereinafter, a wafer level test method of the CRUM chip 200 in a test mode will be described referring to FIGS. 7 to 9.

Figure 7:
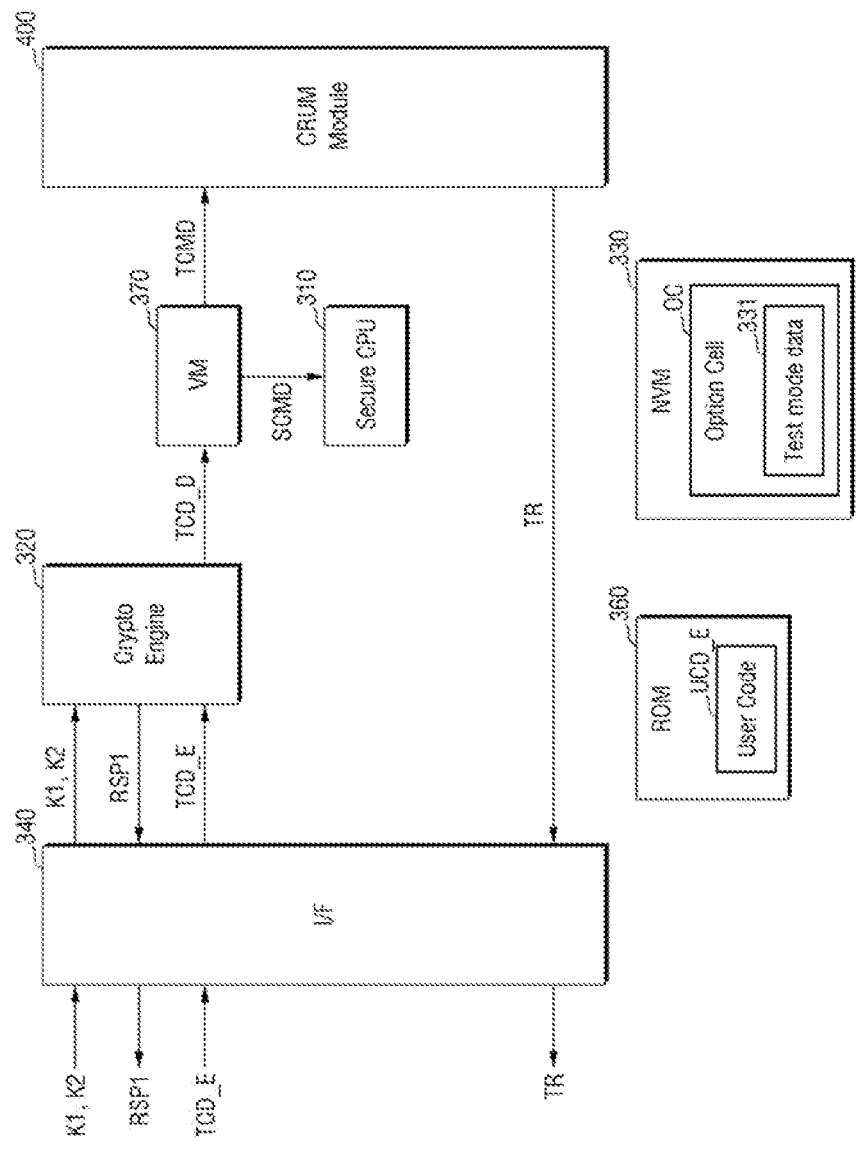
FIG. 7 is a block diagram of a method of operating the semiconductor device in a test mode according to an example embodiment.

FIG. 7 is a block diagram of a method of operating the semiconductor device in a test mode according to an example embodiment. FIG. 8 is a ladder diagram of the method of operating the semiconductor device in the test mode according to an example embodiment. FIG. 9 is a flowchart of the method of operating the semiconductor device in the test mode according to an example embodiment.

Referring to FIG. 7, the CRUM chip 200 may include the secure module 300 and the CRUM module 400.

As described referring to FIG. 2, the CRUM chip 200 may be coupled to the test apparatus 10 having the probe card through the test pads 210 to perform the wafer level test. In the wafer level test or the EDS test, the test circuit 220 may provide the semiconductor device 230 with the test clock signal, the test command signal, the test address signal and/or the test pattern signal received through the test pads 210. The CRUM chip 200 and the test apparatus 10 may communicate through the interface 340.

After the wafer 100 is formed, the wafer level test may be performed on the CRUM chip 200 included in the wafer 100, e.g., to determine whether the CRUM chip 200 is defective through the wafer level test. If the CRUM chip 200 is not defective, the CRUM chip 200 may be determined to be normal, then fabricated into individual unit chips or packages through an assembly process and shipped.

Figure 8:
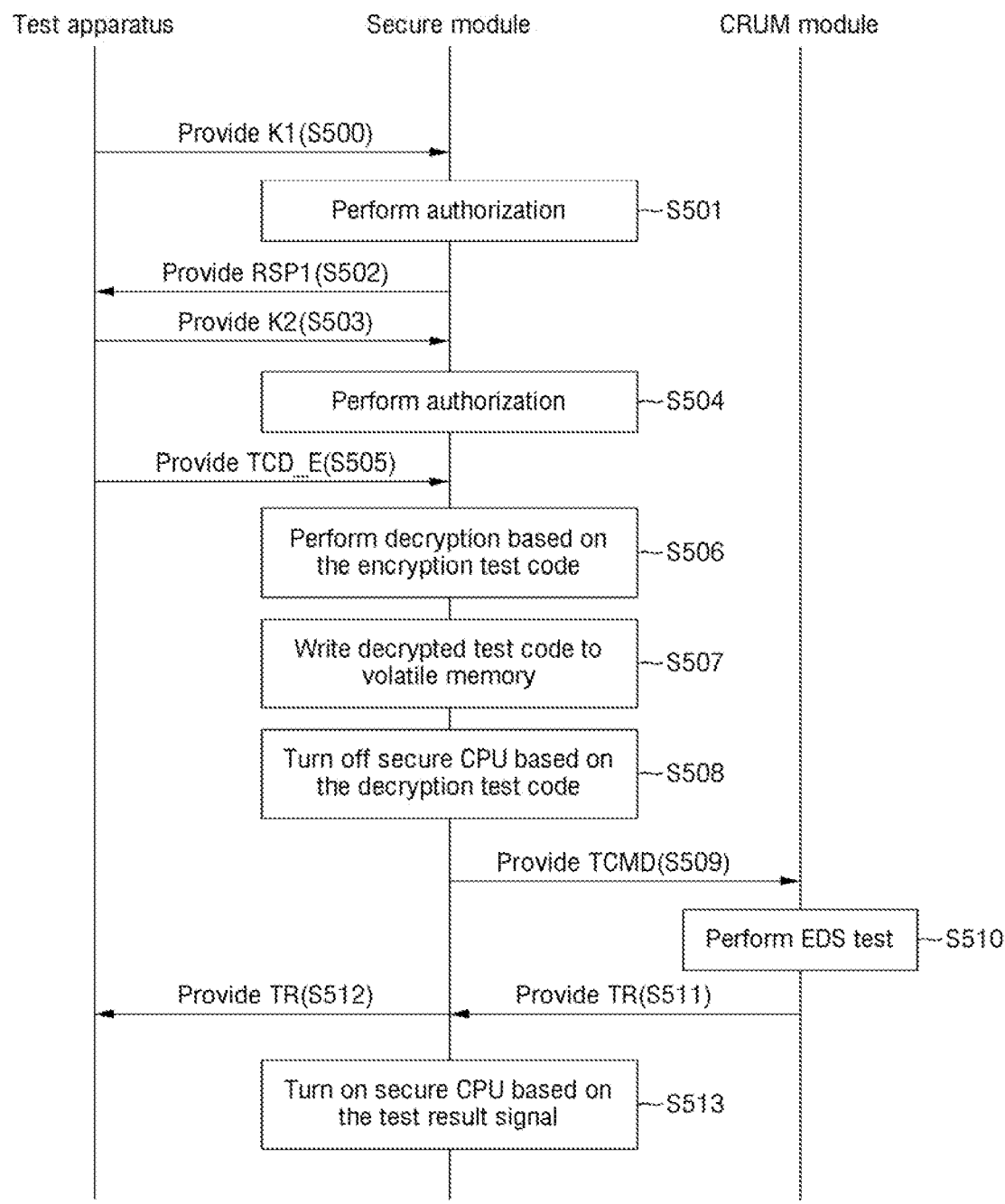
FIG. 8 is a ladder diagram of the method of operating the semiconductor device in the test mode according to an example embodiment.

Referring to FIGS. 7 and 8, the non-volatile memory 330 may include an option cell OC. The option cell OC may be a memory allocated to a part of the non-volatile memory 330. The option cell OC may exist in a state in which test mode data 331 is stored from the time when the CRUM chip 200 is manufactured. For example, the test mode data 331 may be stored in the option cell OC. When the test apparatus 10 is connected to the CRUM chip 200, the secure module 300 may access the option cell OC. For example, the secure module 300 may put the CRUM chip 200 into the test mode on the basis of the test mode data 331.

The test apparatus 10 may provide the first encryption key K1 to the secure module 300 (S500). The interface 340 included in the secure module 300 may receive the first encryption key K1 from the test apparatus 10. The interface 340 may provide the first encryption key K1 to the crypto engine 320.

The secure module 300 may perform authorization, using the first encryption key K1 (S501). For example, the crypto engine 320 may receive the first encryption key K1 from the interface 340, and may perform the authorization, using the first encryption key K1. The crypto engine 320 may compute the public key or private key stored in the PKRAM 325 and the first encryption key K1 to perform authorization. The crypto engine 320 may perform, e.g., an AES computation.

At this time, when the first encryption key K1 corresponds to the public key or the private key, the crypto engine 320 may be successfully authenticated and provide the test apparatus 10 with the first response signal RSP1 (S502). For example, the secure module 300 may output the first response signal RSP1 in response to the first encryption key K1.

The test apparatus 10 may receive the first response signal RSP1 and provide the second encryption key K2 to the secure module 300 in response to the first response signal RSP1 (S503). The second encryption key K2 may be different from the first encryption key K1. For example, the second encryption key K2 may correspond to 32 byte, and may correspond to a key for performing the test of the CRUM module 400.

The secure module 300 may perform authorization, using the second encryption key K2 (S504). For example, the crypto engine 320 may perform authentication using the second encryption key K2. When the crypto engine 320 is successfully authenticated, the secure module 300 may control and operate the CRUM module 400. Here, a response signal may be provided to the test apparatus 10 from the secure module 300 (not shown).

The test apparatus 10 may provide the secure module 300 with an encrypted test code TCD_E (S505). For example, when the authorization using the first encryption key K1 and the second encryption key K2 of the secure module 300 is successful, the test apparatus 10 may provide the encrypted test code TCD_E. The encrypted test code TCD_E may be code that is obtained by encrypting the test code. The test apparatus 10 may internally store the encrypted test code TCD_E, which is the code obtained by encrypting the test code. The test code may include, e.g., commands for performing the EDS test on the CRUM chip 200.

The secure module 300 may perform decryption of the encrypted test code TCD_E (S506). For example, the crypto engine 320 may decrypt the encrypted test code TCD_E to generate decrypted test code TCD_D. The decrypted test code TCD_D may be generated using the public key or private key of the crypto engine 320. In the present example embodiment, the decrypted test code TCD_D or the encrypted test code TCD_E is not stored in the crypto engine 320. The decrypted test code TCD_D may be the same as the test code before being encrypted by the test apparatus 10. For example, the decrypted test code TCD_D may be a test command for performing a wafer level test on the CRUM chip 200 or the CRUM module 400.

The secure module 300 may write the decrypted test code TCD_D to the volatile memory 370 (S507). The crypto engine 320 may provide the generated decrypted test code TCD_D to the volatile memory 370. The volatile memory 370 may temporarily store the decrypted test code TCD_D. For example, the volatile memory 370 may buffer the decrypted test code TCD_D. The volatile memory 370 may correspond to the SRAM. The stored decrypted test code TCD_D may be the same as the test command TCMD.

The secure module 300 may turn off the security CPU 310 on the basis of the decrypted test code TCD_D (S508). When the decrypted test code TCD_D is generated, the secure module 300 may stop the function of the security CPU 310 for the wafer level test. For example, the security CPU 310 may be turned off while the wafer level test is being performed by the test apparatus 10, i.e., in the test mode. Although the security CPU 310 may be turned off by the generated security command SCMD, the security command SCMD shown in FIG. 7 is merely an example. As the security CPU 310 is turned off, the test on the CRUM module 400 may be performed without a security process.

The secure module 300 may provide the test command TCMD to the CRUM module 400 (S509). For example, the volatile memory 370 may provide the test command TCMD to the CRUM module 400. The test command TCMD may correspond to the decrypted test code TCD_D stored in the volatile memory 370.

The CRUM module 400 may perform the EDS test (S510). For example, the CRUM module 400 may perform the wafer level or the EDS test on the CRUM chip 200 using the decrypted test code TCD_D or the test command TCMD received from the volatile memory 370. For example, the CRUM module 400 may determine whether internal configuration of the CRUM chip is normal.

The performing of the test of the CRUM module 400 will now be described in more detail referring to FIG. 9.

Figure 9:
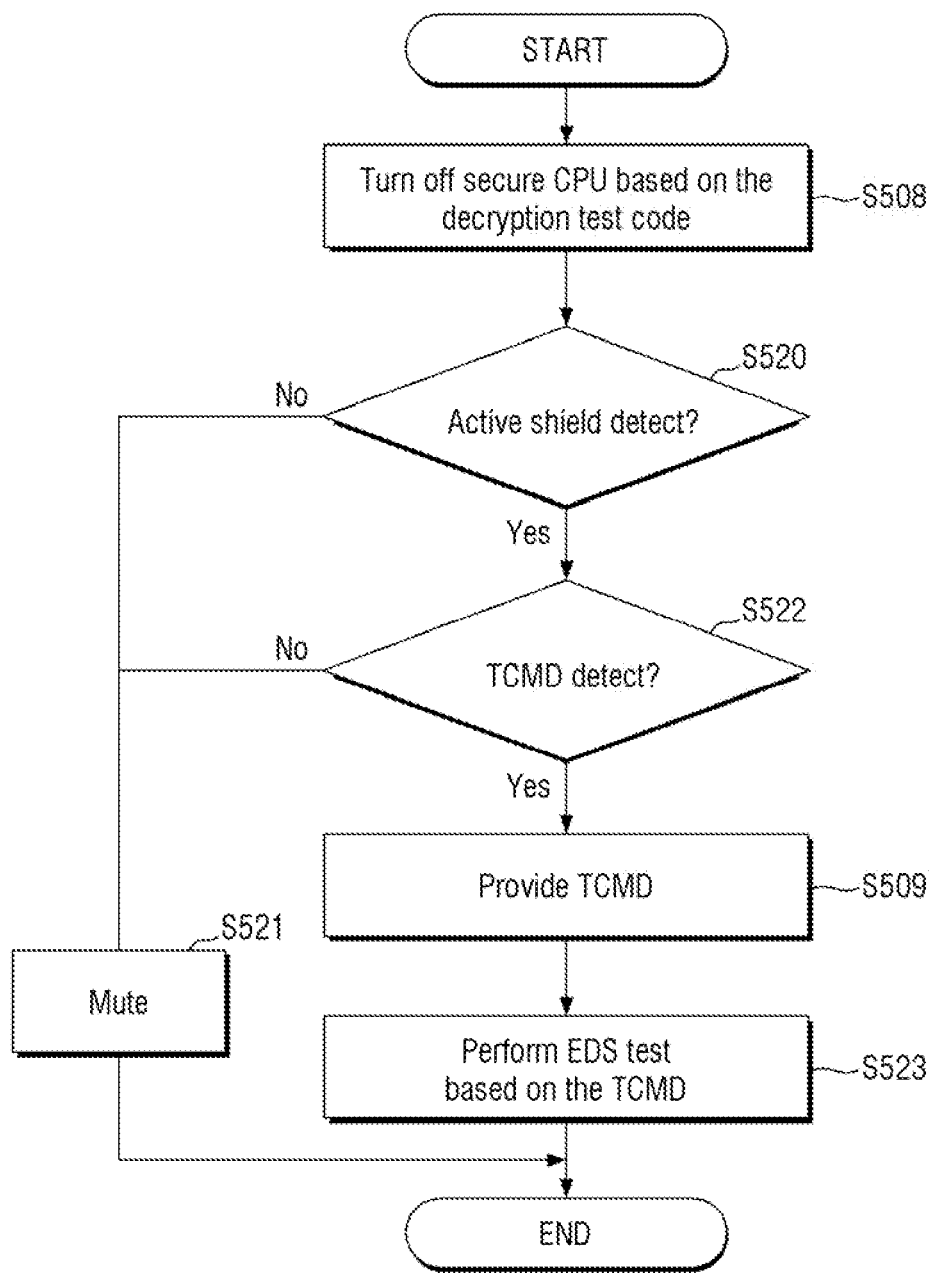
FIG. 9 is a flowchart of the method of operating the semiconductor device in the test mode according to an example embodiment.

Referring to FIG. 9, after the security CPU 310 is turned off on the basis of the decrypted test code TCD_D (S508), the secure module 300 may detect the active shield AS (S520). The secure module 300 may prevent detection of reverse engineering or probing from outside through the active shield AS.

If the active shield AS is detected (S520—Yes), the secure module 300 may detect the test command TCMD (S522). For example, the secure module 300 may determine whether the received test command TCMD is for performing the wafer level test on the CRUM chip 200. If the test command TCMD is detected (S522—Yes), i.e., if the test command TCMD is a defined command, the secure module 300 may provide the test command TCMD to the CRUM module 400 (S509). For example, the CRUM module 400 may perform the EDS test on the basis of the test command TCMD (S523).

If the active shield AS is not detected (S520—No), the secure module 300 may be placed in a mute state (S521). If the test command TCMD is not detected (S522—No), i.e., if the test command TCMD is an undefined command, the secure module 300 may be placed in the mute state.

Referring to FIGS. 7 and 8 again, after the CRUM module 400 completes the test, the CRUM module 400 may provide the test result signal TR to the secure module 300 (S511). The test result signal TR may include the wafer level test result of the CRUM module 400 or the CRUM chip 200. For example, the test result signal TR may include a determination result as to whether the CRUM chip 200 operates normally.

The secure module 300 may provide the test result signal TR to the test apparatus 10 (S512). The test apparatus 10 may determine the state of the CRUM chip 200 based on the test result signal TR. If the test apparatus 10 determines that the CRUM chip 200 is normal, the CRUM chip 200 may be used in a finished product, whereas if the test apparatus 10 determines that the CRUM chip 200 is defective, the CRUM chip 200 may be discarded.

The secure module 300 may turn on the security CPU 310 on the basis of the test result signal TR (S513). For example, after the EDS test of the CRUM module 400 is completed, the security CPU 310 may be turned on. The security process of the secure module 300 may be stopped while the EDS test is being performed. However, after the EDS test is completed, the security process of the secure module 300 may operate or be performed. The test mode data 331 stored in the option cell OC of the non-volatile memory 330 may be deleted after the EDS test is completed. For example, when the CRUM chip 200 is accessed later, the test mode may not be performed, and the user mode may be performed.

The read-only memory 360 may store encrypted user code UCD_E. The read-only memory 360 may not store the encrypted test code TCD_E sent from the test apparatus 10 and may not store the decrypted test code TCD_D generated from the crypto engine 320. As described above, the encrypted user code UCD_E is stored in the read-only memory 360 at the time the CRUM chip 200 is manufactured. However, in the present example embodiment, the encrypted test code TCD_E is not stored in the CRUM chip 200 from the beginning, but instead is provided from the outside. The decrypted test code TCD_D may be buffered in the volatile memory 370, and after the test process is finished, when the volatile memory 370 is reset, the decrypted test code TCD_D may be deleted.

It will be understood that, if the encrypted test code TCD_E or the decrypted test code TCD_D were to be stored in the CRUM chip 200, there would be a risk of a user (e.g., a purchaser or hacker) accessing and acquiring the encrypted test code TCD_E or the decrypted test code TCD_D through cracking and turning off the secure module 300. However, in the present example embodiment, because the encrypted test code TCD_E or the decrypted test code TCD_D is provided from the test apparatus 10 and buffered in the volatile memory 370, the risk of cracking may be decreased, such that the CRUM chip 200 having enhanced security capability may be provided.

Hereinafter, an example of operation of the CRUM chip 200 in the user mode will be described referring to FIGS. 10 and 11.

Figure 10:
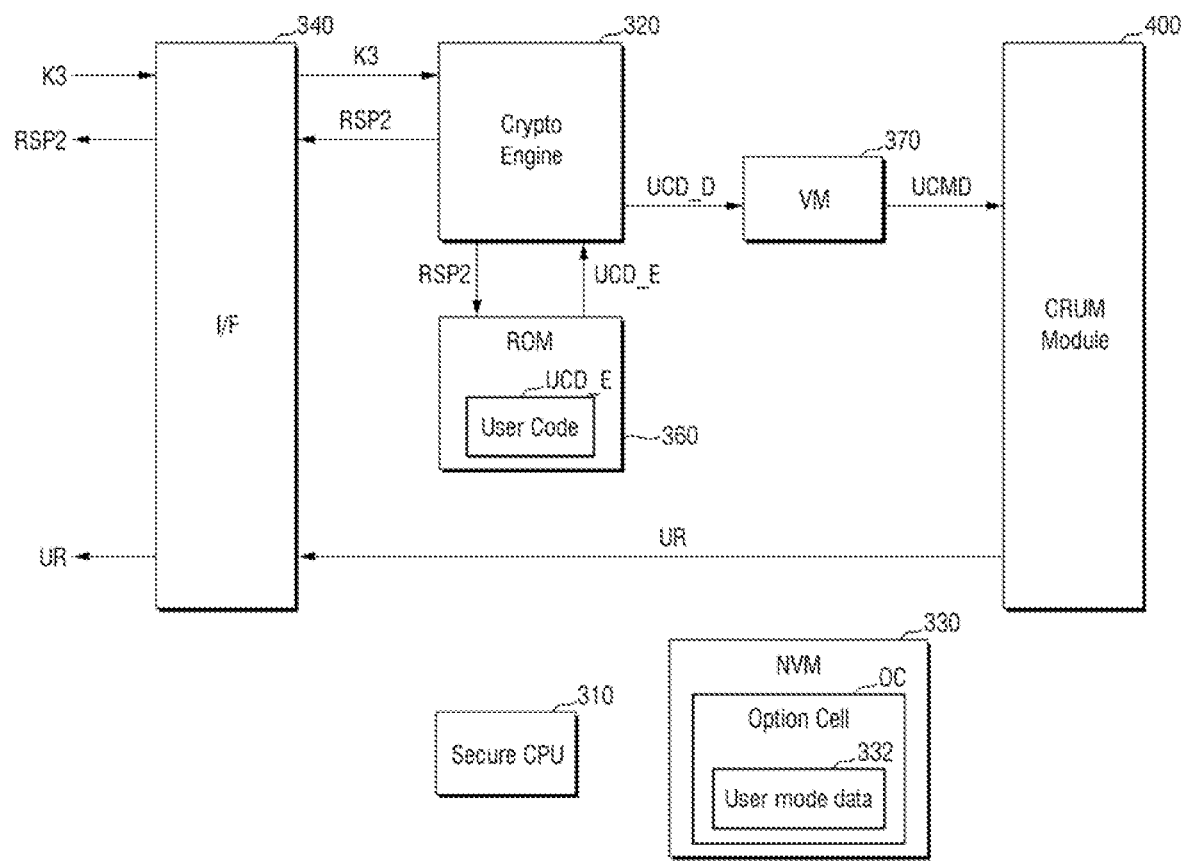
FIG. 10 is a block diagram of a method of operating the semiconductor device in a user mode according to an example embodiment.

FIG. 10 is a block diagram of a method of operating the semiconductor device in the user mode according to an example embodiment. FIG. 11 is a ladder diagram of the method of operating the semiconductor device in the user mode according to an example embodiment.

Figure 11:
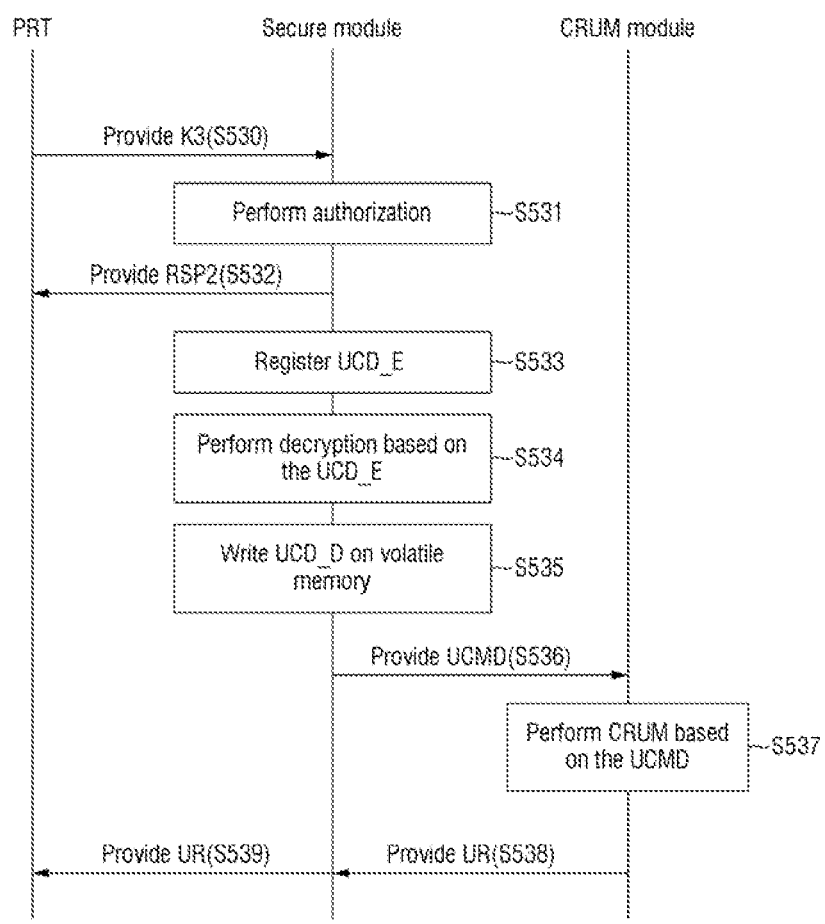
FIG. 11 is a ladder diagram of the method of operating the semiconductor device in the user mode according to an example embodiment.

Referring to FIGS. 10 and 11, the secure module 300 and the CRUM module 400 may operate in the user mode. Here, as described referring to FIG. 1, the user mode corresponds to a case where the CRUM chip 200 attached to the replaceable unit CTR communicates with the main body PRT of the image forming apparatus 1. The CRUM chip 200 may be connected to the replaceable unit CTR and communicate with the main body PRT at some time after the CRUM chip 200 has been tested using the test apparatus 10 and fabricated into individual unit chips or packages through an assembly process.

The option cell OC of the non-volatile memory 330 may store user mode data 332. The user mode data 332 may be stored in place of the test mode data 331 previously described. For example, after the test mode ends, the test mode data 331 may be deleted in the option cell OC, and the user mode data 332 may be stored. At the time of booting-up of the secure module 300, the user mode data 332 may be accessed, and the secure module 300 may be controlled to operate in the user mode.

The security CPU 310 may be turned on to operate normally. For example, as described above the security CPU 310 was turned off while performing the test on the CRUM module 400 in the test mode, but after the test on the CRUM module 400 is completed, the security CPU 310 may be turned on. Therefore, the security CPU 310 may operate normally in the user mode.

The main body PRT of the image forming apparatus 1 may provide the secure module 300 with a third encryption key K3 (S530). The third encryption key K3 may be used for checking whether the replaceable unit CTR connected to the CRUM chip 200 is genuine.

The secure module 300 may perform authorization using the third encryption key K3 (S531).

The secure module 300 may provide a second response signal RSP2 to the main body PRT of the image forming apparatus 1 (S532). The second response signal RSP2 may include information as to whether the replaceable unit CTR connected to the CRUM chip 200 is genuine. If the authorization of the secure module 300 is successful, the main unit PRT of the image forming apparatus 1 may access the CRUM chip 200.

After authorization of the CRUM chip 200 is successful, the secure module 300 may register the encrypted user code UCD_E (S533). The crypto engine 320 may provide the second response signal RSP2 to the read-only memory 360, and the read-only memory 360 may output an encrypted user code UCD_E in response to the second response signal RSP2. The encrypted user code UCD_E may be stored in the read-only memory 360 from the time of manufacture. The crypto engine 320 may register the encrypted user code UCD_E sent from the read-only memory 360.

The secure module 300 may perform decryption of the encrypted user code UCD_E (S534). The crypto engine 320 may decrypt the encrypted user code UCD_E to generate a decrypted user code UCD_D. The decrypted user code UCD_D may correspond to a user command UCMD for use in the CRUM module 400.

The secure module 300 may write the decrypted user code UCD_D to the volatile memory 370 (S535).

The crypto engine 320 may provide the decrypted user code UCD_D to the volatile memory 370, and the volatile memory 370 may buffer the decrypted user code UCD_D. The volatile memory 370 may provide the buffered decrypted user code UCD_D to the CRUM module 400. For example, the volatile memory 370 may provide the user command UCMD to the CRUM module 400 (S536).

The CRUM module 400 may perform replaceable unit monitoring on the basis of the received user command UCMD (S537). Here, because the user command UCMD is not provided to the main body PRT of the image forming apparatus 1 but is provided from the read-only memory 360, the time for performing the replaceable unit monitoring may be reduced.

After the replaceable unit monitoring is completed, the CRUM module 400 may provide the secure module 300 with a user result signal UR (S538).

The secure module 300 may provide the user result signal UR to the main body PRT of the image forming apparatus 1 (S539). Accordingly, the main body PRT of the image forming apparatus 1 may perform authorization on the CRUM chip 200 and receive information about the CRUM chip 200.

Hereinafter, a smart card payment system according to an example embodiment will be described referring to FIGS. 12 to 15.

Figure 12:
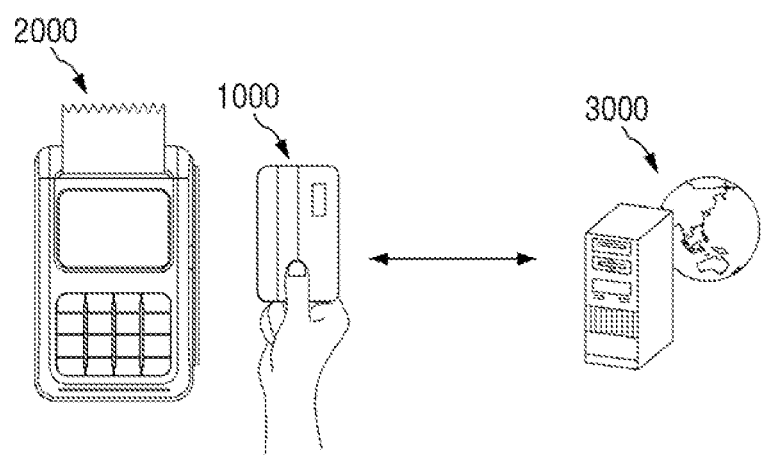
FIG. 12 is a diagram showing a biometric authentication-based smart card payment system according to an example embodiment.
Figure 13:
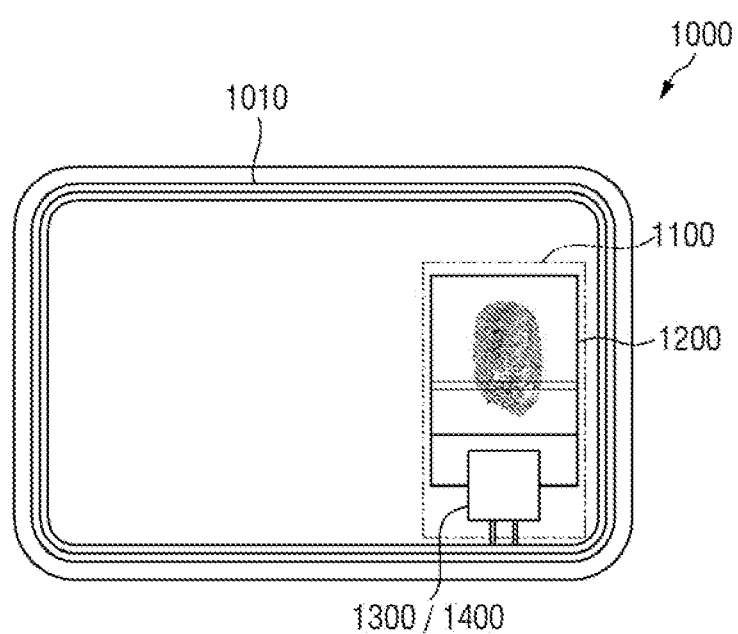
FIG. 13 is a diagram for explaining a smart card according to an example embodiment.
Figure 14:
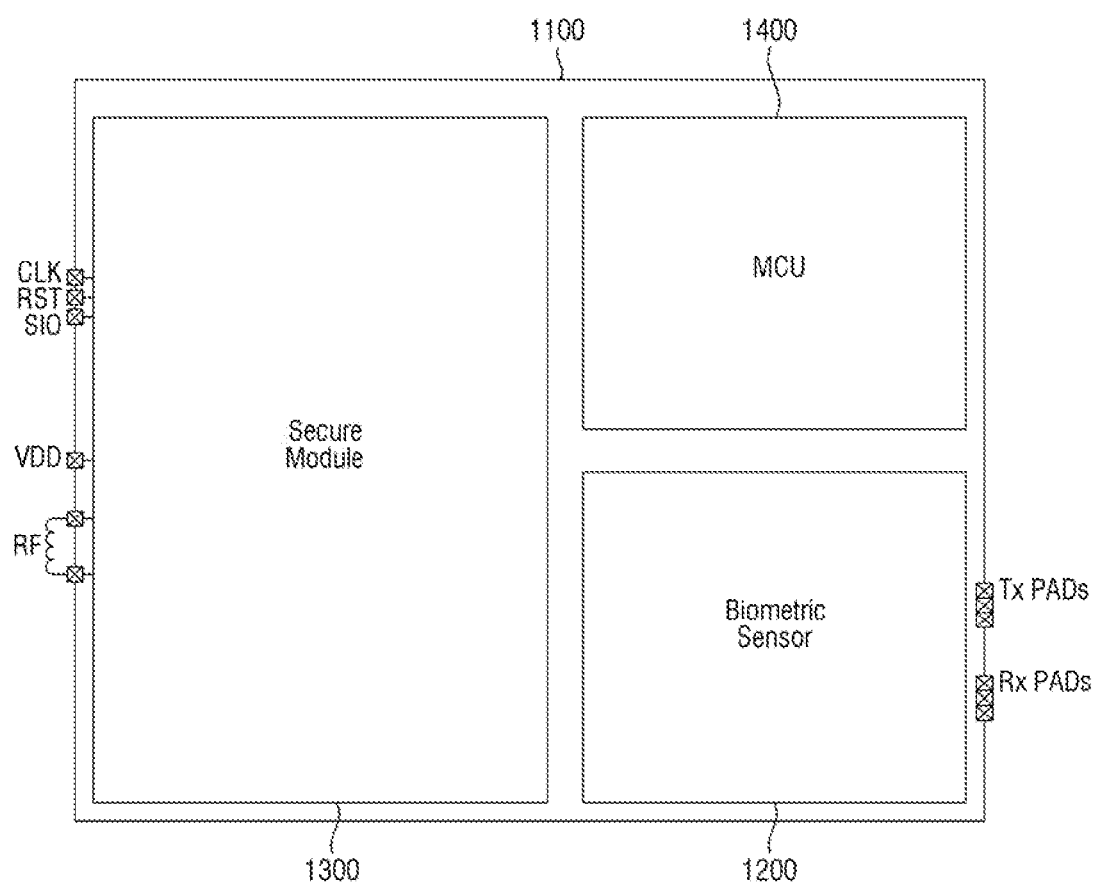
FIG. 14 is a block diagram of a biometric authentication integrated chip according to an example embodiment.
Figure 15:
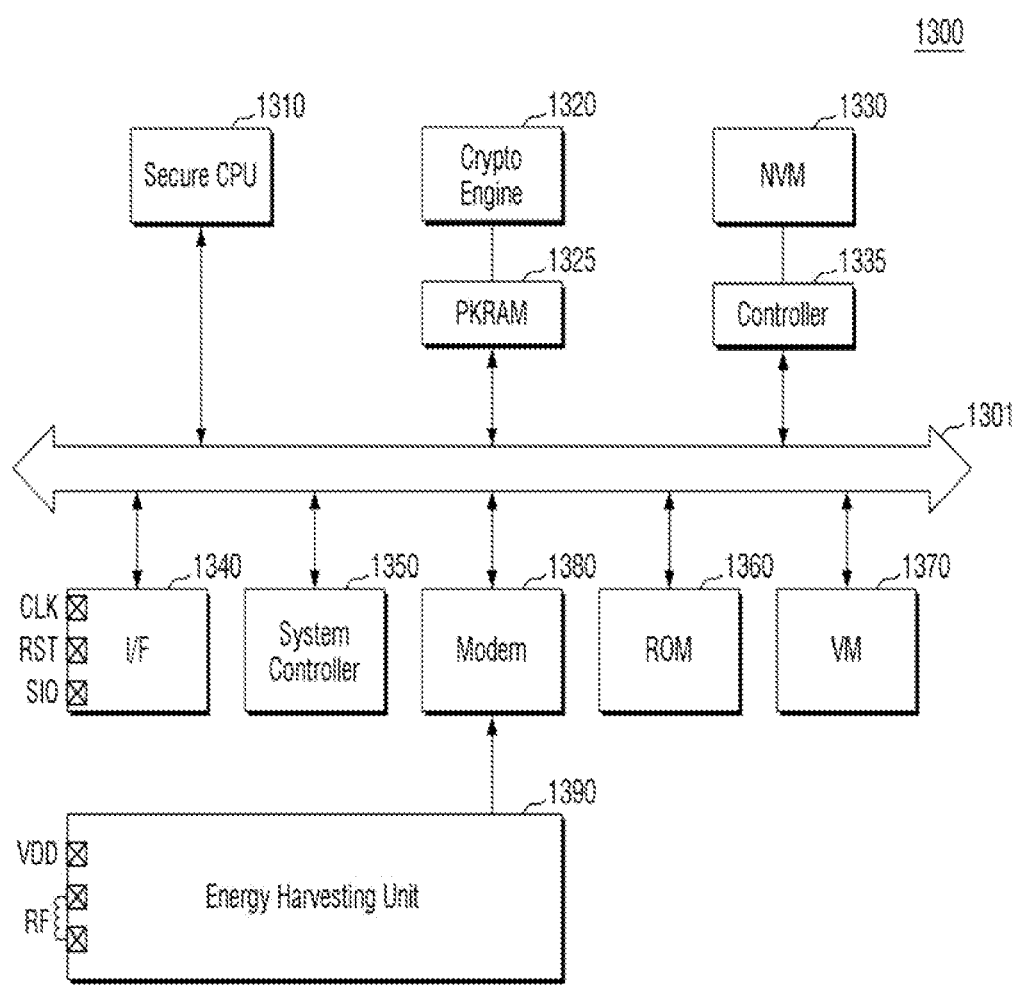
FIG. 15 is a block diagram of the secure module of FIG. 14.

FIG. 12 is a diagram showing a biometric authentication-based smart card payment system according to an example embodiment. FIG. 13 is a diagram for explaining a smart card according to an example embodiment. FIG. 14 is a block diagram of a biometric authentication integrated chip according to an example embodiment. FIG. 15 is a block diagram of the secure module of FIG. 14 according to an example embodiment. For convenience of explanation, repeated parts of contents explained using FIGS. 1 to 11 may be briefly described or omitted.

Referring to FIG. 12, a smart card payment system may include a smart card 1000, a payment terminal 2000, and a payment server 3000.

The smart card 1000 may be, e.g., a general smart card, a biometric authentication-based smart card, etc. The smart card 1000 may be implemented in a form in which a semiconductor chip, which provides various functions, is mounted in a plastic card having, e.g., a credit card shape.

The smart card 1000 may be implemented as a contact type, which operates when the integrated chip 1100 in the smart card 1000 comes into contact with the payment terminal 2000. The smart card 1000 may be implemented as a non-contact type, in which data may be sent and received at a distance close to the integrated chip 1100.

In an example implementation, when payment request information including deposit information is output from the payment terminal 2000 on- or off-line, the smart card 1000 may output payment method information corresponding to the payment request information.

The payment terminal 2000 may store deposit information such as type, quantity, and price of products to be sold on- or off-line, and may manage sales information of each product. The payment terminal 2000 may be, e.g., a point-of-sale terminal (POS terminal) of a store in the case of the off-line, may be an online shopping mall system in the case of the on-line, may be a terminal device that may access a smart card to read payment-related information and communicate with a payment server, etc. The payment terminal 2000 may be installed in an off-line store, and may read product information from a barcode or the like connected to each of the products for sale, using a reader, or the like. The product information may include information such as a product type, a product code, and a selling price. The payment terminal 2000 may transmit sales-related information to the payment server 3000. The sales-related information may include, e.g., the selling price information, an ID of the payment terminal 2000, a reading time of the selling price information of the product by the payment terminal 2000, the type of works to be processed by the payment terminal 2000, domain information about the management server of the payment terminal 2000, and deposit account information of the payment terminal 2000 holder. The payment terminal 2000 may transmit the payment information read from the smart card 1000 to the payment server 3000. The payment information may include payment evaluation information and payment method information of the user registered in the smart card 1000. The payment method information may include payment account information or payment card information. The payment account information may be information about the user's bank account, and may include at least one of a bank account number, an account password, and a security-related authorization number. The payment card information may include information of, e.g., a card company for paying the cost, a card number, and a card password. In the case of implementing biometric functionality, it may be checked to see if a user is a registered user of the smart card 1000 on the basis of biometric authentication information of the payment information that is read from the smart card 1000, and in the case of the registered user, the payment terminal 2000 may transmit the payment evaluation information corresponding to the user index of the user to the payment server 3000.

The payment server 3000 may determine whether to approve a payment on the basis of the sales-related information and the payment information received from the payment terminal 2000, and may transmit the approval determination result to the payment terminal 2000. The payment server 3000 may determine whether to approve the payment of the amounts according to the sales-related information based on the received payment method information and the payment evaluation information, on the basis of the payment information. For example, when the payment information is payment account information, the payment server 3000 may be a payment server of a financial institution (a bank, etc.) in which a user's financial account is opened. If the payment information is payment card information, the payment server 3000 may be the payment server of the financial institution in which the user's payment card is opened. In this specification, a normal user is a registered user stored in the payment server 3000, and may mean a user who has amounts equal to or higher than payment request amounts in the payment account or a user who has a payment card in which payment request amounts are within the usable limits. When a user is determined as a normal user, the payment server 3000 checks the sales price information and an ID of the payment terminal 2000 from the sales-related information, compares them with the payment information, and determines whether to approve the payment. Additional details thereof will be provided below.

Referring to FIGS. 13 and 14, the smart card 1000 may include an antenna 1010 and an integrated chip 1100.

The integrated chip 1100 may include a biological authorization module 1200, a secure module 1300, and an information processing module 1400 in one chip.

The biological authorization module 1200 may provide a means for enhancing the security of the smart card 1000. The biological authorization module 1200 may determine, e.g., whether fingerprint information of an actual owner (that is, a person registered in advance) of the smart card 1000 matches fingerprint information of a card user. When the fingerprints match as a result of determination, the biological authorization module 1200 may authenticate the actual owner of the card, thereby unlocking the secure module 1300 built in the smart card 1000 for a predetermined time. The biological authorization module 1200 may automatically turn off the unlocking, i.e., re-lock, after a predetermined time to prevent unauthorized use of the smart card 1000. The biological authorization module 1200 may include a sensor that senses fingerprints or the like, and may sense fingerprints by an electrostatic method, a piezoelectric method, or the like. The biological authorization module 1200 may use a swipe method in which a finger is drawn across to sense a fingerprint, or an area method in which a finger is touched for a certain period of time to detect a fingerprint.

The secure module 1300 may be an integrated circuit that records and stores the card identification information of the smart card 1000. The secure module 1300 may transmit the recorded card identification information to the payment terminal 2000 using a contact method or a non-contact method to perform an electronic payment. The secure module 1300 may temporarily record the card identification information, and modify or delete the recorded card identification information. The secure module 1300 may record the card identification information on a piece of payment method information among the plurality of pieces of payment method information. The card identification information may be information corresponding to payment method information, and may include information used for electronic payment, such as card number information, card expiration date information, and card security information.

The secure module 1300 may implement high security requirements, e.g., of an Evaluation Assurance Level of EAL5+ level or higher. To satisfy the security requirements, in an example embodiment all internal components within the secure module 1300 and the data processed by the secure module 1300 are encrypted on the basis of a random key.

For example, the secure module 1300 may encrypt and store the fingerprint information of the actual owner of the card (a person registered in advance) and prevent external exposure. When the fingerprint information extracted from the biological authorization module 1200 needs to be verified by the use of the smart card 1000, the secure module 1300 may receive the registered fingerprint information from the information processing module 1400, and determine whether to approve the use of the smart card 1000 depending on the matching result.

The information processing module 1400 may process a raw image of the fingerprint received from the biological authorization module 1200, and generate it as a fingerprint template. The raw image may include feature points of fingerprint, e.g., minutiae, which are fine feature points such as ridge ends and bifurcations found in the fingerprint image. The information processing module 1400 may acquire the template information of the fingerprint image, i.e., the fingerprint information for verification through the detection of the minutiae.

Referring to FIG. 15, the secure module 1300 may include a security CPU 1310, a crypto engine 1320, a PKRAM 1325, a non-volatile memory 1330, a memory controller 1335, an interface 1340, a system controller 1350, a read-only memory ROM 1360, a volatile memory 1370, a modem 1380, and an energy harvesting unit 1390.

The security CPU 1310, the crypto engine 1320, the PKRAM 1325, the non-volatile memory 1330, the memory controller 1335, the interface 1340, the system controller 1350, the read-only memory (ROM) 1360 and the volatile memory 1370 of the secure module 1300 may be the same as the security CPU 310, the crypto engine 320, the PKRAM 325, the non-volatile memory 330, the memory controller 335, the interface 340, the system controller 350, the read-only memory (ROM) 360, and the volatile memory 370 described referring to FIGS. 1 to 11.

The modem 1380 may receive commands from a host device (e.g., the payment terminal 2000) or transmit data according to the command processing to the host device. Unlike the interface 1340, the modem 1380 may communicate with the host device in a non-contact manner by ISO 14443 standard. The modem 1380 may be connected to the energy harvesting unit 1390. The energy harvesting unit 1390 may be connected to an RF pin connected to the antenna 1010. The energy harvesting unit 1390 may receive an RF signal through the antenna 1010, and generate power on the basis of the received RF signal. The modem 1380 may supply the generated power to the secure module 1300 to drive the smart card 1000.

During the manufacture of the smart card 1000, an integrated circuit including the secure module 1300 may be connected to the test apparatus 10 to perform an EDS test, as described above in connection with the secure module 300. When the EDS test is performed, the secure module 1300 may receive the encrypted test code TCD_E from the test apparatus 10. For example, the secure module 1300 included in the smart card 1000 may perform a test on the information processing module 1400 on the basis of the encrypted test code TCD_E. The test apparatus 10 may receive the test result signal TR from the information processing module 1400. Accordingly, a smart card 1000 having improved security capability may be provided.

By way of summation and review, an integrated circuit (IC) or chip may be implemented with a test mode and a user mode. In the user mode, functions of a memory in the IC or chip may be performed securely using encryption and decryption of commands and/or data. In the test mode, the encryption and decryption functions of all memory can be turned off, and provisions may be made to disable each security feature. Function testing, e.g., during an electric die sorting test (EDS test) may be performed using the test mode and, after the testing such as the EDS test is performed, the IC or chip may be delivered to a customer or user after being set in the user mode. In general, when such an IC or chip is in the test mode, the testing such as the EDS test may be performed using test code stored in a test ROM as ROM code in the IC or chip, but in the hands of the consumer or user it is possible that the ROM code may be cracked, e.g., using ROM code analysis, such that the customer or user can access (or enter) the test mode.

As described above, embodiments may provide an IC or chip that avoids being cracked, e.g., to eliminate or remove the possibility of access (entry) to the test mode, by eliminating (removing) the test code inside the ROM.

For proper management, a replaceable unit such as a consumable (e.g., a printer cartridge such as a consumable toner cartridge) may include a CRUM chip (customer replaceable unit monitor chip) attached to the consumable. An image forming apparatus such as a printer may connect to the replaceable unit, and may receive information about the replaceable unit through the CRUM chip. Thus, for example an image forming apparatus such as a printer may confirm or certify that a genuine replaceable unit such as a genuine toner cartridge is present, using the CRUM chip. It is desirable to restrict access to CRUM chip code, e.g., to prevent the copying of code that is used to certify the replaceable unit. However, when, e.g., an image forming apparatus and a CRUM chip communicate with each other, data or code stored in the CRUM chip may be leaked or revealed by cracking, thus weakening the security or guarantee of a genuine replaceable unit that is intended to be provided by the CRUM chip.

Thus, embodiments may provide a CRUM chip and a smart card having improved security capability.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A customer replaceable unit monitor (CRUM) integrated circuit (IC), comprising:
 a secure module to receive an encryption key and an encrypted test code from outside; and a CRUM module controlled by the secure module, wherein:

the secure module performs authorization on the basis of the received encryption key, the secure module performs decryption of the encrypted test code to generate a decrypted test code, the secure module stores the decrypted test code in a volatile memory, and the secure module generates a test command for performing a wafer level test based on the decrypted test code in the volatile memory, and provides the test command to the CRUM module.

2. The CRUM IC as claimed in claim 1, wherein the secure module turns off a security function of the secure module on the basis of the decrypted test code.

3. The CRUM IC as claimed in claim 2, wherein the secure module turns off the security function of the secure module when providing the test command to the CRUM module.

4. The CRUM IC as claimed in claim 2, wherein the secure module turns on the security function of the secure module after the CRUM module completes the test command.

5. The CRUM IC as claimed in claim 1, wherein:

the volatile memory stores the decrypted test code while the CRUM module performs the test command, and the volatile memory does not store the decrypted test code after the CRUM module completes the test command.

6. The CRUM IC as claimed in claim 5, wherein the secure module resets the volatile memory after the CRUM module completes the test command.

7. The CRUM IC as claimed in claim 1, wherein the secure module outputs a result of the test command performed by the CRUM module, in response to the encryption key and the encrypted test code.

8. The CRUM IC as claimed in claim 1, wherein the secure module generates the decrypted test code after authorization succeeds on the basis of the encryption key.

9. The CRUM IC as claimed in claim 1, wherein the volatile memory includes a static random access memory.

10. A method of operating a customer replaceable unit monitor CRUM integrated circuit (IC), comprising:

operating in a test mode and operating in a user mode, wherein:

operating in the test mode includes:

performing decryption of an encrypted test code to generate a decrypted test code;

storing the decrypted test code in a volatile memory; and turning off a security function of the CRUM IC while performing a test command for performing a wafer level test on the basis of the decrypted test code, and operating in the user mode includes:

performing authorization in response to an encryption key received from a host; and monitoring the CRUM IC using a user code stored in a read-only memory.

11. The method as claimed in claim 10, wherein the read-only memory does not store the encrypted test code and does not store the decrypted test code.

12. The method as claimed in claim 10, wherein operating in the test mode further includes turning on the security function of the CRUM IC after the test command is performed.

13. The method as claimed in claim 12, wherein operating in the user mode is performed while the security function of the CRUM IC is turned on.

14. The method as claimed in claim 10, wherein operating in the test mode includes outputting a result of the test command in response to the encrypted test code.

15. The method as claimed in claim 10, wherein the user mode is set after the test mode.

16. The method as claimed in claim 10, wherein operating in the test mode includes resetting the volatile memory after the test command.

17. A smart card, comprising:

a secure module to receive an encryption key and an encrypted test code from outside; and an information processing module controlled by the secure module, wherein:

the secure module performs authorization on the basis of the received encryption key, the secure module performs decryption of the encrypted test code to generate a decrypted test code, the secure module stores the decrypted test code in a volatile memory, and the secure module generates a test command for performing a wafer level test based on the decrypted test code in the volatile memory, and provides the test command to the information processing module.

18. The smart card as claimed in claim 17, wherein the secure module turns off a security function of the secure module on the basis of the decrypted test code.

19. The smart card as claimed in claim 17, wherein:

the volatile memory stores the decrypted test code while the information processing module performs the test command, and the volatile memory does not store the decrypted test code after the information processing module completes the test command.

20. The smart card as claimed in claim 17, wherein the volatile memory includes a static random access memory.

* * * * *